United States Patent
Rose et al.

[19]

[11] Patent Number: 6,138,086
[45] Date of Patent: Oct. 24, 2000

[54] ENCODING OF LANGUAGE, COUNTRY AND CHARACTER FORMATS FOR MULTIPLE LANGUAGE DISPLAY AND TRANSMISSION

[75] Inventors: Daniel A. Rose; Baldev S. Soor, both of Markham; V. S. Umamaheswaran, Ajax, all of Canada

[73] Assignee: International Business Machines Corporation, Armonk, N.Y.

[21] Appl. No.: 08/869,108

[22] Filed: Jun. 4, 1997

[30] Foreign Application Priority Data

Dec. 24, 1996 [CA] Canada ................................. 2194019

[51] Int. Cl.[7] ............................................ G06F 17/28
[52] U.S. Cl. .............................................................. 704/8
[58] Field of Search ............................ 704/1, 8; 345/467

[56] References Cited

U.S. PATENT DOCUMENTS

| | | |
|---|---|---|
| 4,685,060 | 8/1987 | Yamano et al. ............................. 704/4 |
| 5,337,233 | 8/1994 | Hofert et al. ............................... 704/8 |
| 5,682,158 | 10/1997 | Edberg et al. ............................. 341/90 |
| 5,793,381 | 8/1998 | Edberg et al. .............................. 704/8 |

*Primary Examiner*—Forester W. Isen
*Assistant Examiner*—Patrick N. Edouard
*Attorney, Agent, or Firm*—Bernard D. Bogdon

[57] ABSTRACT

A computer system is described that is capable of transmitting and displaying files containing variable locale selectors, that is, language, territory and coded character set identifiers. The system contains a code that is transmitted as part of the files, and includes information defining the language and the territory, which are alphanumeric variables normally encoded in binary format, and the coded character set, which is normally encoded as a numeric decimal format. The discrete values of known combinations of these codes are listed, preferably in a lookup table, and each known set of coded values is given a unique hexadecimal value. The hexadecimal value is retained with the subject file and used by a user interface adapter to display the information in the file according to the desired set of locale selectors.

22 Claims, 8 Drawing Sheets

Industry Convention

FIG. 3A
(PRIOR ART)

OSF Convention

| Table 4 (Page 1 of 22). Crosss reference of locale names with encodings. (WR/BS - NLTC - Draft 1.2) | | | | |
|---|---|---|---|---|
| Country or Territory | Suggested Name | CCSID (hex) | Char Set (dec) | Code Page (dec) |
| Afghanistan | ps_AF | - | - | - |
| Albania | sq_AL | 0366 | 00959 | 00870 |
|  |  | 1354 | 00959 | 00852 |
|  |  | 0390 | 00959 | 00912 |
|  |  | 04B8** | 65535 | 1400 |
|  |  |  | 65535 | 1449 |
| Algeria | ar_DZ | - | - | - |
| American Samoa | sm_AS | - | - | - |
| Andorra | ca_AD | - | - | - |
| Angola | pt_AO | - | - | - |
| Anguilla | en_GB | - | - | - |
| Antigua and Barbuda | en_AG | - | - | - |

FIG. 5B

| Locale Name | Restricted Name | Locale Token (hex) | Description/ Comments |
|---|---|---|---|
| - | - | - | Afghanistan |
| - | SQAL0366 | 1000 | Latin2 EBCDIC Multilingual |
| - | SQAL1354 | 1001 | Latin2 Personal Computer |
| - | SQAL0390 | 1002 | Latin2 ISO 8859-2 |
| sq_AL.ISO10646.UTF8U2L3* | SQAL04B8 | 10B6 | UTF-8 (UCS-2 level 3), maximal CS; no PUA** |
|  |  |  | PUA = IBM Default, maximal CS; only PUA** |
| - | - | - | Algeria |
| - | - | - | Samoa |
| - | - | - | Andorra |
| - | - | - | Portuguese Angola |
| - | - | - | Anguilla (UK) |
| - | - | - | Antigua and Barbuda |

| Argentina | es_AR | 011C | 00697 | 00284 |
| --- | --- | --- | --- | --- |
| | | 1352 | 00697 | 00850 |
| | | 0333 | 00697 | 00819 |
| | | 04B8** | 65535 | 1400 |
| | | | 65535 | 1449 |
| Armenia | hy_AM | - | - | - |
| Aruba | nl_AW | - | - | - |
| Australia | en_AU | 0025 | 00697 | 00037 |
| | | 1352 | 00697 | 00850 |
| | | 0333 | 00697 | 00819 |
| | | 04B8** | 65535 | 1400 |
| | | | 65535 | 1449 |

FIG. 5C

| | | | |
|---|---|---|---|
| - | ESAR011C | 1003 | EBCDIC Latin America |
| - | ESAR01352 | 1004 | PC data 190 |
| - | ESAR0333 | 1005 | ISO 8859-1 |
| es_AR.ISO10646.UTF8U2L3 | ESAR04B8 | 1007 | UTF-8 (UCS-2 level 3), maximal CS; no PUA** |
| | | | PUA = IBM Default, maximal CS; only PUA** |
| - | - | - | Armenian |
| - | - | - | Aruba (Netherlands) |
| - | ENAU0025 | 1006 | EBCDIC Latin1 |
| - | ENAU1352 | 1007 | PC Data 190 |
| - | ENAU0333 | 1008 | ISO 8859-1 |
| en_AU.ISO10646.UTF8U2L3 | ENAU04B8 | 10B8 | UTF-8 (UCS-2 level 3), maximal CS; no PUA** |
| | | | PUA = IBM Default, maximal CS; only PUA** |

FIG. 5D

ENCODING OF LANGUAGE, COUNTRY AND CHARACTER FORMATS FOR MULTIPLE LANGUAGE DISPLAY AND TRANSMISSION

FIELD OF THE INVENTION

This invention relates to computerized systems for encoding character sets, language and territorial information to allow computer systems in different countries to properly represent the information in data files to the users in each country who have a need for specific versions of the information.

BACKGROUND OF THE INVENTION

As computer software and hardware becomes used in an increasing number of countries, there is an increasing demand to make available in the user's language and character set, and with the user's conventions of date, time, territory and currency, all of the increasing amount of information at the user interface, and in files and documents. In the past this has either not been done at all, or has been customised so that any given document or screen page has been prepared with the required conventions buried in the document or file. As a result, such a national language document has been convenient for readers and user only in the particular location and using the peculiar representations of date, time, territory and currency that are appropriate for that one document. If it was desired to use the same document in another language or territory, the new users had either to take it as it was in the original form, or to perform language and character conversion and other culturally-based changes at the cost of considerable time and labour. In an effort to codify the representation of date, time, currency, territory and character set to enable them to be reproduced in the required combinations those needing "national language" representations developed various means. For example, selection of character sets has been done in the personal computer arena for a number of years by using the notion of code pages. Various international groups, notably the International Standards Organization, have developed and standardized two-character identifiers for country, for example, "CA" for Canada and "US" for the United States of America. Identifiers for language have also been defined, for example "fr" for French. Since many languages are spoken in more than one territory and many territories include more than one language, these have been combined to yield, for example, an identifier for French in Canada "fr_CA", or for Spanish in Chile "es_CL". Meanwhile some combinations are unique; for example, Afghanistan uses only one official language and is identified as "ps_AF". Other information has also been standardized, for example currency. Moreover, character sets vary immensely as well, and some accents used in some countries do not appear in the same language as written in other countries. For example, Canadian French uses accents on capital letters, whereas French in France does not. Normally these differences are accommodated by the Coded Character Set Identifier (CCSID). In the personal computer world, the CCSID is represented by a decimal code that can be up to five decimal digits; for example Code 437 is the coded character set most regularly used in the USA, and 850 is frequently used internationally.

With increasing internationalization of computer applications, there is a need to represent all of the unique instances in the files being transferred to the computers that are processing the information for presentation to users and for printing, in different territories and with different languages and character sets.

Operating systems currently in use in the computer industry utilize many diverse file naming systems of varying degrees of restriction, for example, Unix®, X/Open™, OS/2®, and DOS. The most restrictive of these, DOS, uses a file naming convention having eight primary characters and three extension characters, which are not case-sensitive. Locale names cannot be readily shared across these file systems because of their unique naming support capabilities. Such locale names have been comprised of the language, territory or country and character encoding identifier, resulting in a text string of varying length, frequently eight or more characters.

There is no system known to date that automatically converts input text and data into output that recognizes not only the national language preference of a user, but also the territory and the encoding to be used for the graphic character data. Thus there remains a need to define unambiguous names for the various locales that will be implemented across different platforms. In order to provide these definitions, a scheme which can accommodate the needs of the users, the systems and the file systems is required. The current industry-accepted manner of specifying the national language preferences of the user is the announcement and definition mechanism provided by the "locale". To date, standards put forward by the International Standards Organization (ISO) have been used for language and territory, but no appropriate scheme has been standardized for the graphic character data. ISO has also standardized on coded character set IDs for a number of years, for example ISO 10646 denotes Unicode. The practice of using mixed case alphabetic letters to identify the language and country without any form of precise encoding identifier as a means of differentiating the encoding that is supported, has led to confusion as to the content of the locale and has also hindered the understanding of the specific properties of the locale. It would also be desirable to incorporate the complete set of identities, language, territory or country, and graphic character identifier, into a single token, thus unambiguously identifying all the variables that are required for any particular implementation of language, territory and character encoding.

SUMMARY OF THE INVENTION

Accordingly, the present invention is directed to a computer system providing a new naming scheme including a language identifier, a territory identifier, and a character encoding identifier all contained within four 8-bit bytes in hexadecimal notation.

The invention provides that the set of identifiers including the language identifier, the territory identifier and the coded character set identifier are represented in a four digit hexadecimal representation. The identifier is thereby adapted to fit into a space of four characters. This is the maximum available in the most constrained file naming system, DOS, which is limited to an eight-character name followed by a period and a three-character extension. Moreover, typically in DOS the three-character extension is used to identify the type of file and thus those three characters are not available for locale identification.

In conventional systems of naming locale preferences, a number of well-recognized standards have been promulgated. For representing language, the International Standards Organization (ISO) has developed Standard 639 which provides a two-character alphabetic format, which is sufficient to define all of the languages now used or likely to be used in computer-generated text and data. A second ISO standard, Number 3166, provides a territory, i.e. geographic, indicator. Together these have been used to indicate the handling of factors such as collation sequence, displaying of numerals, for example with a decimal point represented by either a period or a comma, the monetary symbol to be used, for example $ symbol, £ symbol, or a ¥ symbol, and also how the time is to be represented. It is highly desirable to incorporate these two well known codes into any comprehensive coding scheme. A codeset identifier string exists in a number of data processing architectures and varies in length. Thus a complete representation of the territory, language and codeset ID in a Unix filename would be, for example, "en_US.ISO8859-1". However, no solutions have been developed that have incorporated up to fifteen bytes of character information as represented in a Unix filename, into a file name having as little as eight characters plus three extension characters, which is the number of characters provided by DOS which is widely used and for which any universal identification system must make a provision.

Although four 8-bit bytes are available in the most limited file naming system, two of them are used for a prescribed set of corporation codes in the OSF layout and thus only two bytes are available to describe the language, territory and coded graphic character set of each data file.

It is therefore an object of the present invention to provide a naming scheme which can uniquely identify all of the languages, countries, and coded character sets in current and proposed use throughout the world.

It is a further object of this invention to provide a naming scheme that can fit within the file naming requirements of the shortest filename spaces that are currently used or expected to be used.

Accordingly, the present invention provides a method of transmitting a set of values describing language, territory and character encoding attributes of a transmitted file, from a first computer system to a second computer system, including defining a first code indicating required attributes of language, defining a second code indicating required attributes of country, and defining a third code indicating a coded graphic character set identifier, wherein unique sets of combined values of the three codes are provided in a combined code that is represented in hexadecimal form. The present invention further provides a computer system adapted to transmit a set of values describing language, territory and character encoding attributes of each transmitted file to another computer system, including a storage means containing a first code indicating required attributes of language, a second code indicating required attributes of territory, and a third code indicating a coded graphic character set identifier, and a lookup table adapted to convert each uniquely known combination of the first, second and third codes into a unique 16-bit locale code, wherein unique sets of combined values of the three codes are provided in a locale code that is represented in hexadecimal form.

The present invention further provides a software product on a machine-readable medium, the software product being adapted to store a file containing a single four-byte hexadecimal value uniquely defining language, territory and character encoding attributes of the file, including a first code indicating required attributes of language, a second code indicating required attributes of territory, and a third code indicating a coded graphic character set identifier, and a lookup table providing a mapping of unique combinations of the first, second and third codes to a four-byte hexadecimal number.

BRIEF DESCRIPTION OF THE DRAWINGS

FIG. 5 is comprised of FIGS. 5A, 5B, 5C and 5D, each depicting one quadrant of a lookup table, as illustrated, and is an example of a portion of a lookup table for translation according to a preferred embodiment of the invention.

DESCRIPTION OF THE PREFERRED EMBODIMENT

Figure 1:
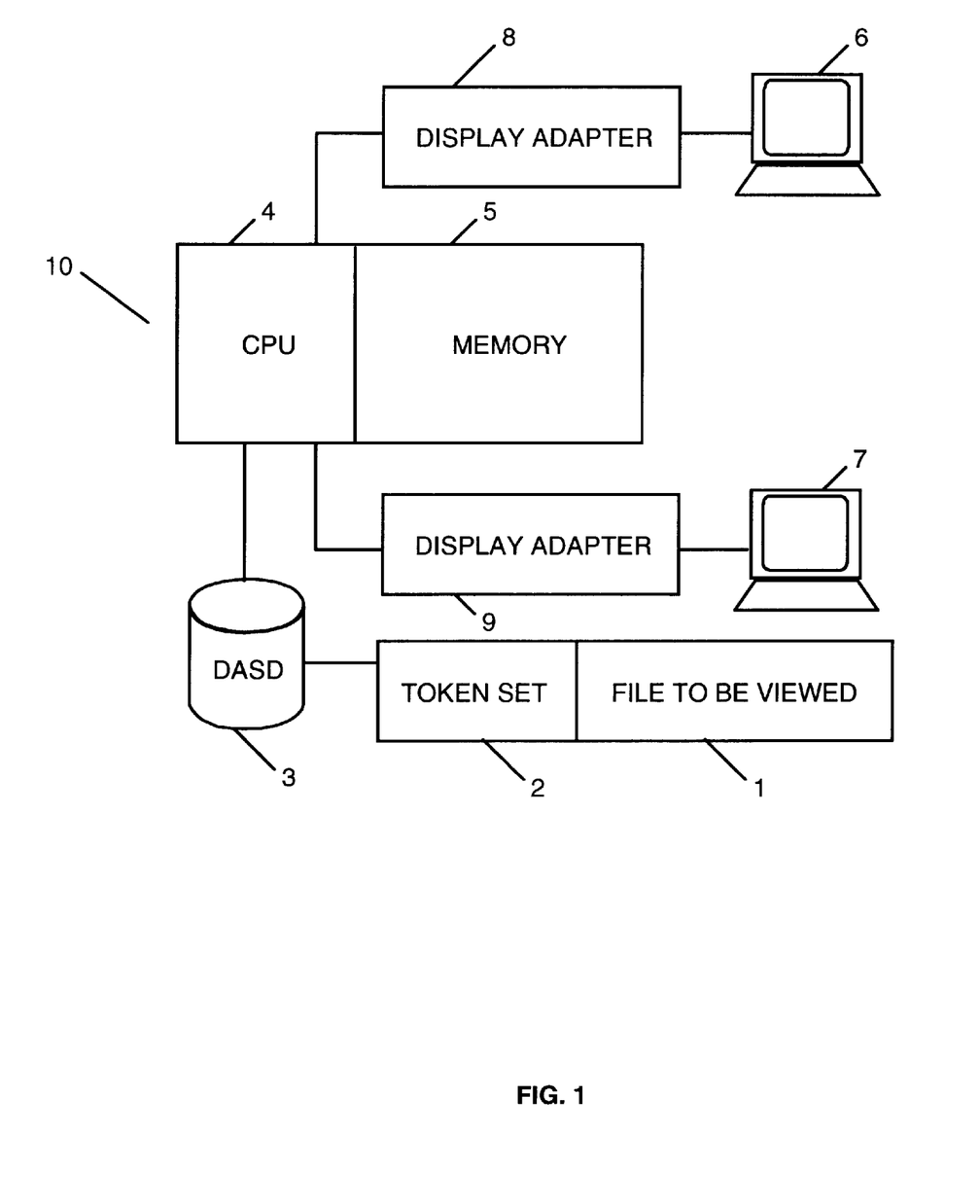
FIG. 1 is a schematic diagram of a computer system capable of generating and processing files with unique language, territory and coded character set identifiers.

FIG. 1 shows a general purpose computer system adapted to generate, store and display a file that has locale attributes stored in token identifiers according to the present invention. File 1, which is to be displayed on the system, contains a locale token in token area 2, which defines the locale according to which the file is intended to be displayed. The locale token is a two-byte hexadecimal first locale code which includes sufficient information to uniquely define the language, territory and Coded Character Set Identifier (CCSID). These three identifiers together define the representation of the file when displayed or printed. Thus no rendering information about the file and its appearance need be stored. The file 1 resides on a storage device 3, preferably a Direct Access Storage Device (DASD). When displayed for a first user using terminal 6, the file is read wholly or in portions into central processing unit (CPU) 4, stored temporarily in memory 5 and displayed on terminal 6 through a display adapter 8. The display adapter 8 includes a lookup or translation table of a type known to those skilled in the art, which reads the combined code of the file, compares it to the desired display characteristics for the first user and, if it differs from the desired code, converts the locale code of the file into the appropriate first locale code for the first user at terminal 6. The lookup or file conversion table need not be included in the display adapter; alternatively it can be stored in DASD and read into a portion of the CPU reserved for or identified with the first user, or in any other convenient storage location. Using a first conversion table according to the preferences of the first user, the first locale code is mapped into the unique set of three tokens that describe the language, territory and CCSID appropriate to the first user. Should a second user at terminal 7 desire to display or work with the file, the file will be sent through display adapter 9 which, similar to display adapter 8, contains the preferences of the second user at terminal 9. Conversion of the code into the display preferences of the second user occurs in a manner similar to that in display adapter 8, and the file is displayed at terminal 7 using the file display preferences of the second user. The use of individual language codes, territory codes and CCSIDs is known to those skilled in the art.

Figure 2:
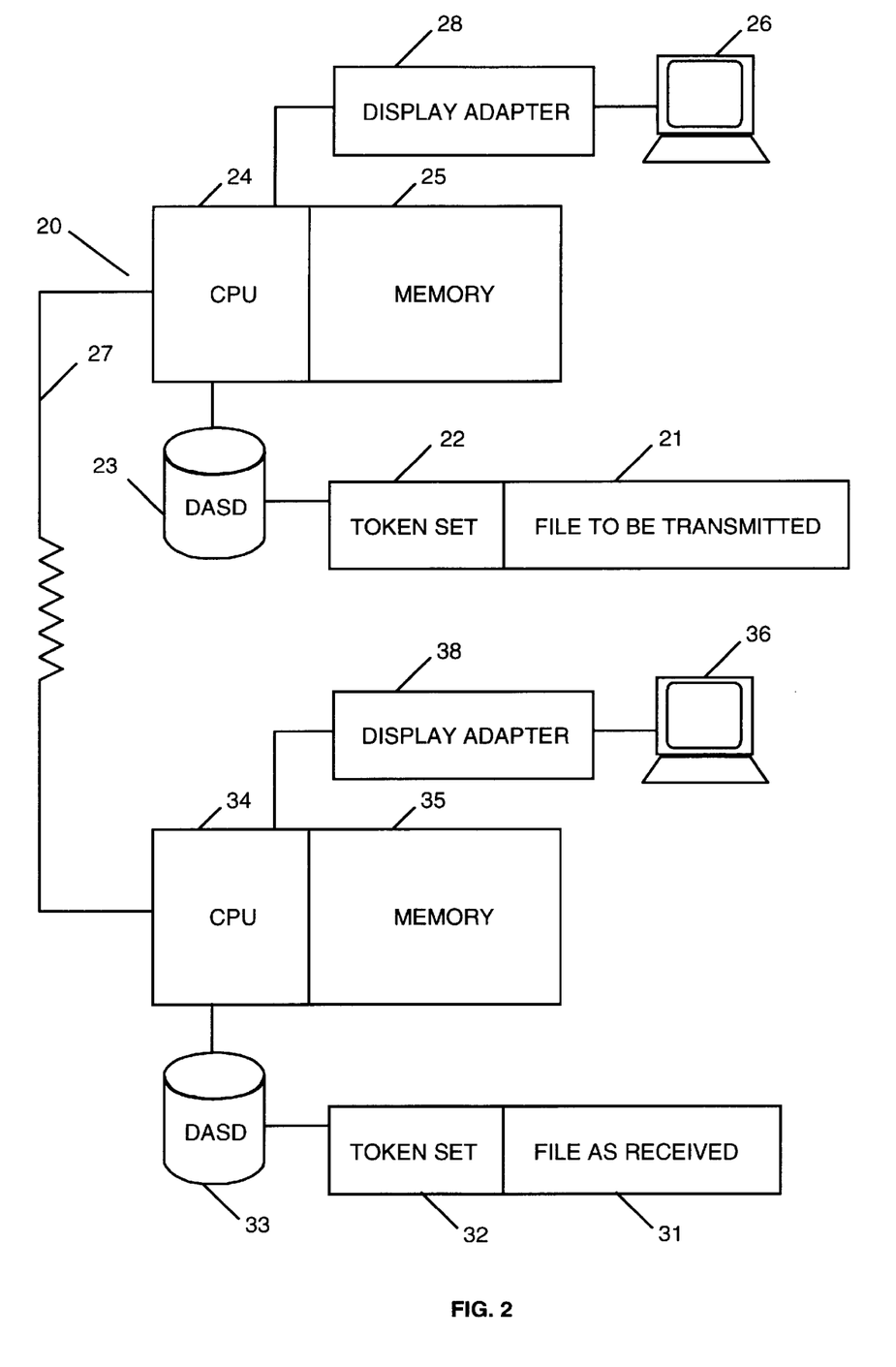
FIG. 2 is a schematic diagram of a sending computer system and a receiving computer system capable of transmitting and receiving files with unique language, territory and coded character set identifiers.

In a similar manner a file can be prepared on a first computer system using the desired display characteristics for that system and transmitted to a second computer system. Thus FIG. 2 illustrates a general purpose computer system adapted to generate, store and send, and a second general purpose computer system adapted to receive, store and display a file containing token identifiers according to the present invention. File 1, which is to be sent, contains token area 2 and resides on a storage device 3, preferably a Direct Access Storage Device (DASD). The overall computer system 10 includes a processor (CPU) 4, memory 5 and a terminal 6 by which a user can interact with the system. These elements are connected by link 7, which can be any convenient form of link, for example wire, fibre optics or radiated e.m.f, to remote CPU 14, memory 15, DASD 13 and terminal 16. As described above, file 1 contains a locale token in token area 2 whose maximum size is two bytes in order to be compatible with all file identification systems as described above. Because token area 2 contains language, territory and coded character set identifiers, file 1 can be displayed on terminal 6 or other appropriate output device, displaying the correct characteristic to be attributed to the file, for example accented characters, monetary units, representation of time and the specific character set used by the file. Under the control of the user at terminal 6 or under software control, file 1 is sent from DASD 3 and CPU 4 through link 7 to remote CPU 14, and is stored on remote DASD 13. Token area 12, which remains unchanged during the transmission of the file 1 and its reception as file 11, continues to identify uniquely the desired characteristics of file 11 and causes it to display properly on remote terminal 16 or other appropriate output device. The person skilled in the art will understand that terminal 16 must have adequate capability to display the converted file, otherwise the file may not appear to be successfully converted in all cases.

Figure 3A:
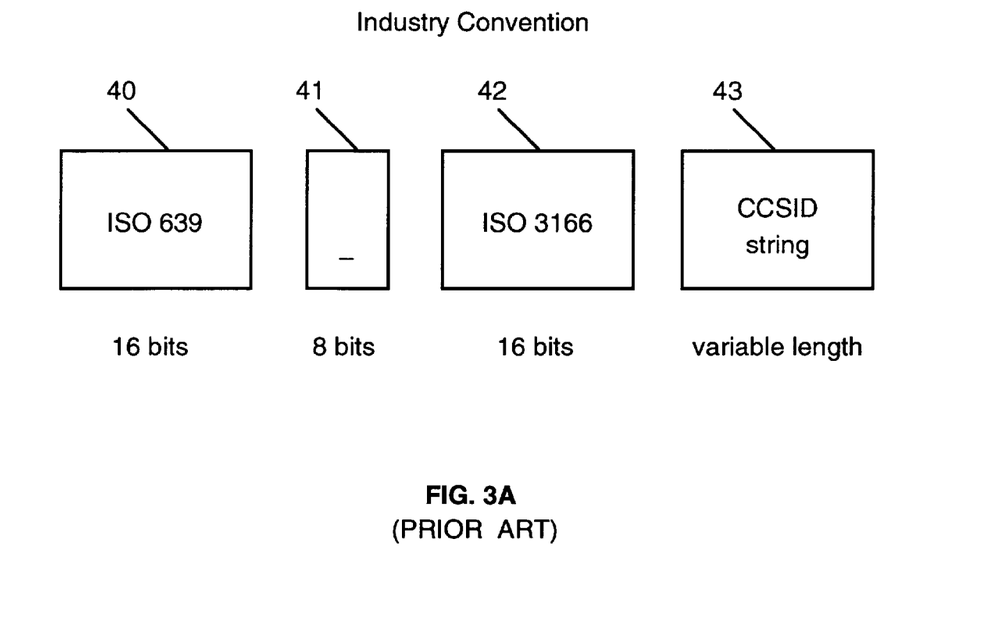
FIG. 3A is a diagram of a known token architecture.

The two parts of FIG. 3 illustrate the architecture of two representative known token formats. FIG. 3A illustrates an industry convention for the display according to the prior art. The designator for language token 20 defines the language used in association with the file. The language token 20 is customarily defined according to ISO standard 639, which requires the use of a two-byte alphabetic character code. Following the language token is a country or territory token 22 which is also 16 bits long and defines the country or territory used in determining the cultural conventions associated with the file. Between tokens 20 and 22 is a single byte underbar character 21, sometimes called an underscore, which is used as a separator between the language token and the country or territory token 22. The coded character set identifier token 23 is a variable length character string. In total, the industry convention requires at least five bytes plus the character string which is typically six to ten bytes.

Figure 3B:
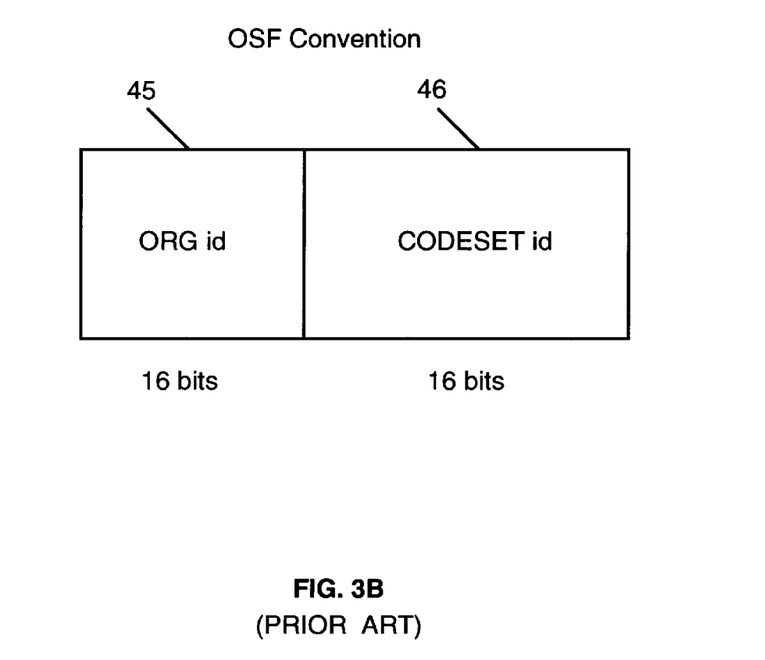
FIG. 3B is a diagram of a second known token architecture.

FIG. 3B illustrates a standard promulgated by the Open Software Foundation containing two parts. The first part consists of organization identifier 30, and is 16 bits long. The second part is codeset identifier 31, which is also 16 bits long.

Figure 4:
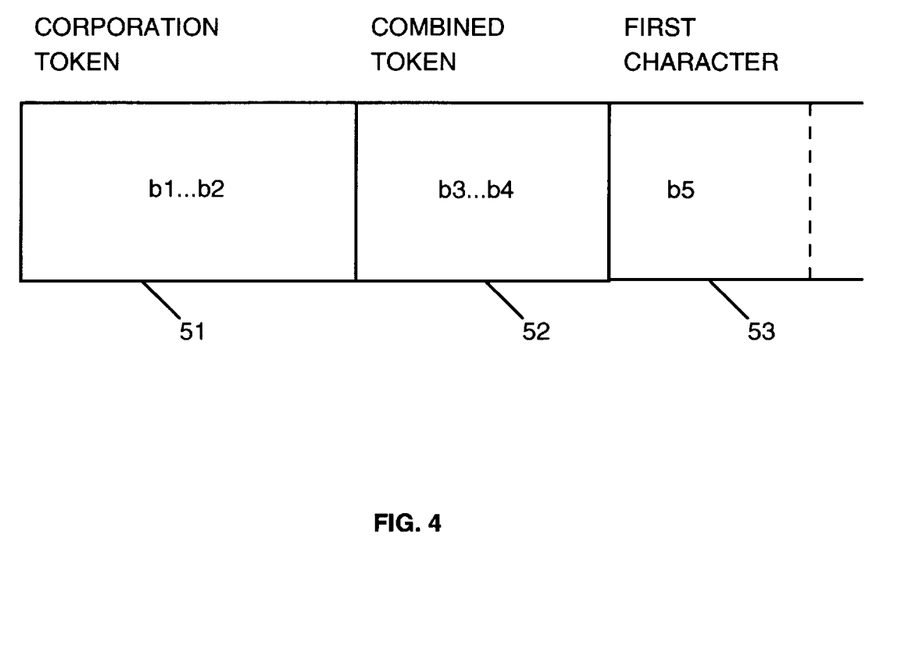
FIG. 4 is a diagram of a preferred embodiment of the token architecture of FIG. 2.

FIG. 4 illustrates the architecture of a locale token according to a preferred embodiment of the invention. A token 51 of two bytes (16 bits) is used to designate the source corporation. A locale token 52 is two 8-bit bytes and uses all of the values available within the hexadecimal bytes themselves. It contains a unique value designating the combination of language, territory and CCSID desired for the particular file or particular user.

The underlying form of territory identifier can be any suitable identifier, for example the form defined by ISO standard 3166, which requires the use of two bytes to represent its two alphabetic characters. The reason the ISO identifier is said to be underlying is that it is not directly represented in the designator of the invention, but is translated and restored through use of a standard type of lookup, or translation, table in a manner known to those skilled in the art. In the underlying ISO form, the alphabetic characters are used in upper case only.

Similarly, the preferred underlying form of language identifier is that of the ISO standard 639 which in its ISO form consists of two alphabetic characters in lower case. If the two ISO tokens were used as is, each would provide only 676 possible combinations, yet would occupy all four of the bytes available for the entire language, territory and CCSID designation.

Existing Coded Character Set Identifiers (CCSIDs) are represented by Arabic numerals and can be up to four digits in length. Taken in combination, the three identifiers describe all of the necessary information about the desired presentation to the user. In the available two bytes, there is not enough space for a full CCSID token in addition to the language and territory identifiers.

The preferred embodiment of the combined token contains the two bytes $B_3$ and $B_4$, and because it is represented in hexadecimal form, is capable of distinguishing 65,536 different codes. This number is more than enough to distinguish all of the known, proposed and foreseeable combinations of language, territory and code pages for CCSIDs.

In FIG. 4, following the four bytes of the combined token 52, the first character 53 of the remaining portion of the file is used for its normal function, for example a text character or a binary code, as is well known to those skilled in the art.

An example of the use of a preferred embodiment of the invention is a note created originally for display or printing in Albania, using the language identifier "sq" and the territory identifier "AL". In this example we use the CCSID 0366, which is one of the three CCSIDs registered for Albania. These three identifiers are encoded by an encoding tokenization table, which has the form of a lookup table, in a sending computer and replaced by the single four-byte hexadecimal value 10B6. Following transmission of this note to a receiving computer of a French-language user in Belgium, the token is converted by a matching decoding tokenization table in the receiving computer and converted to the language and territory "fr_BE" and the CCSID 01F4. The file then presents transparently to the French-speaking Belgian user as if it had been created using the user's territory, language and CCSID.

Figures 5, 5A:
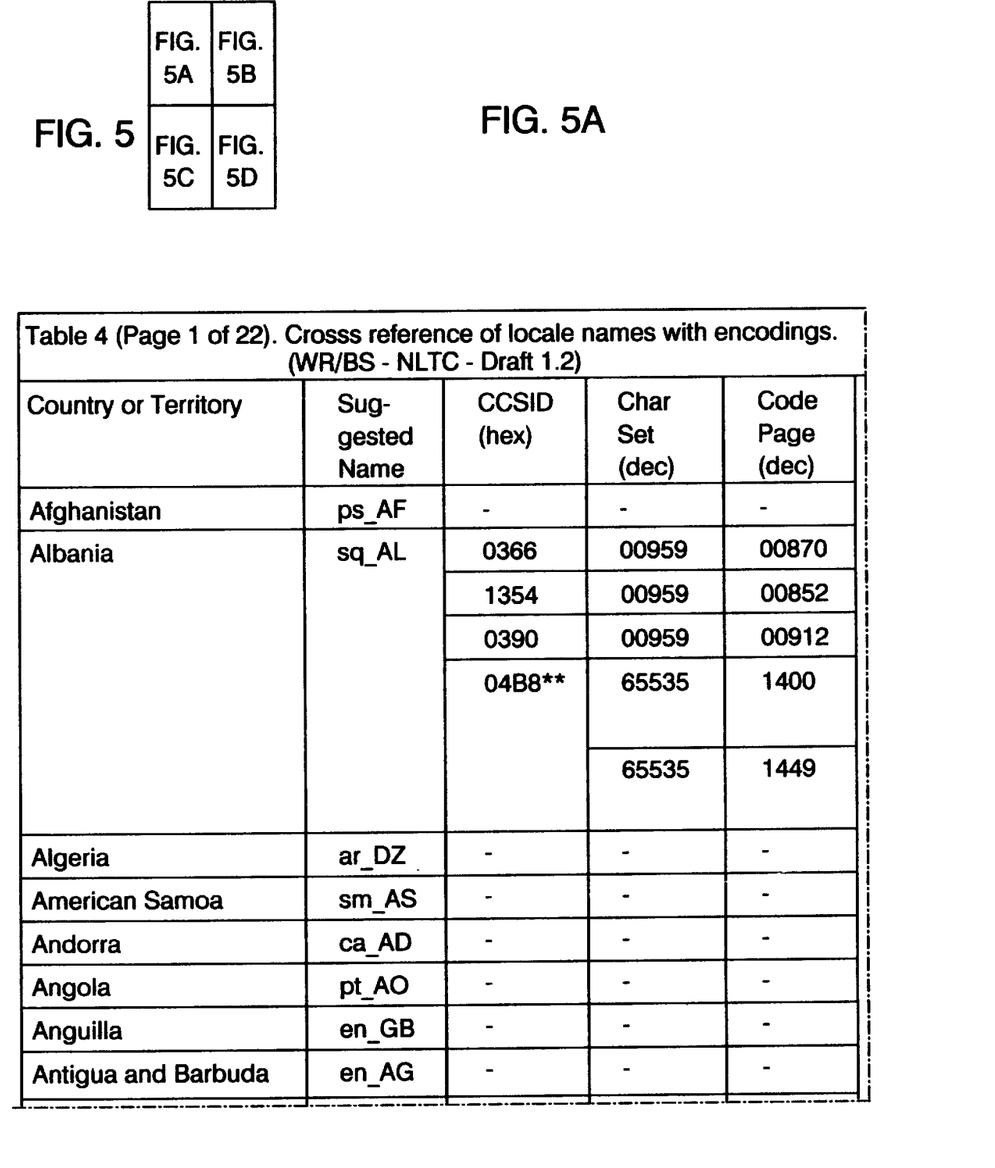
Figure 5B:
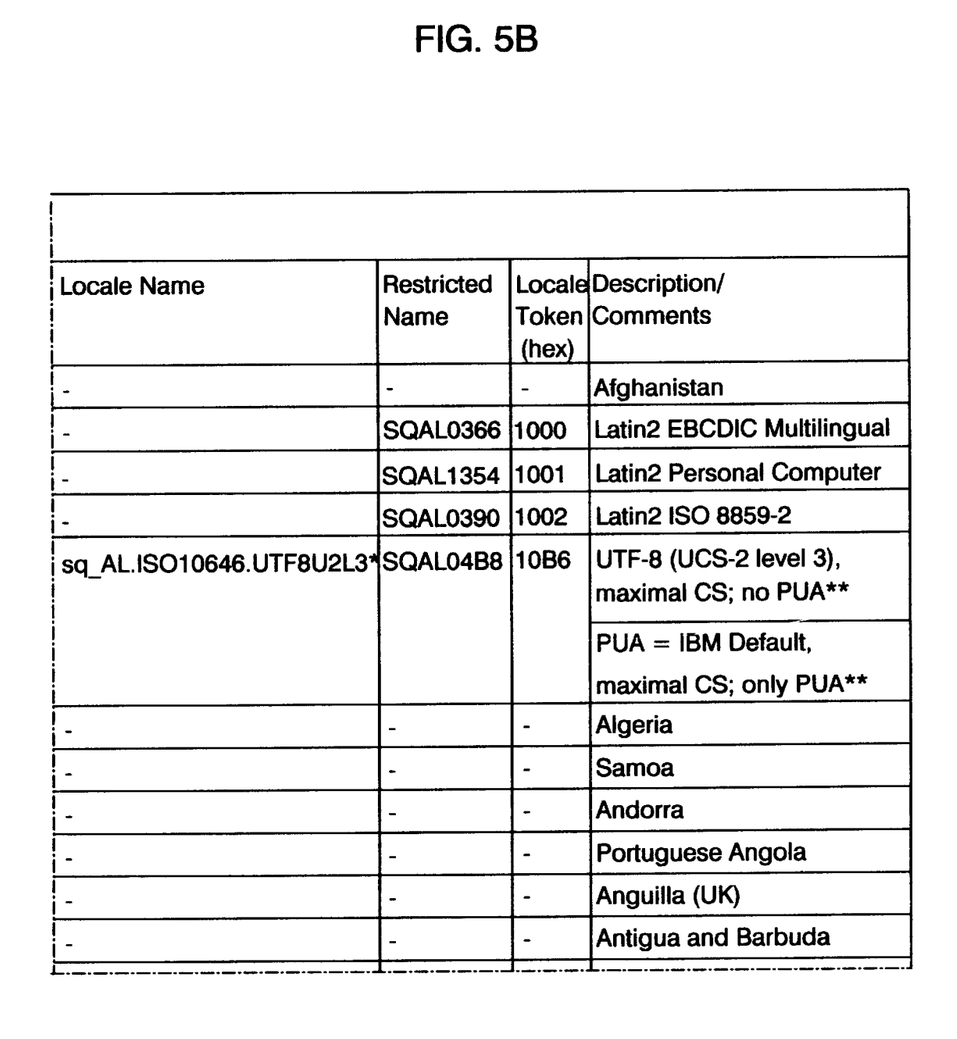
Figure 5C:
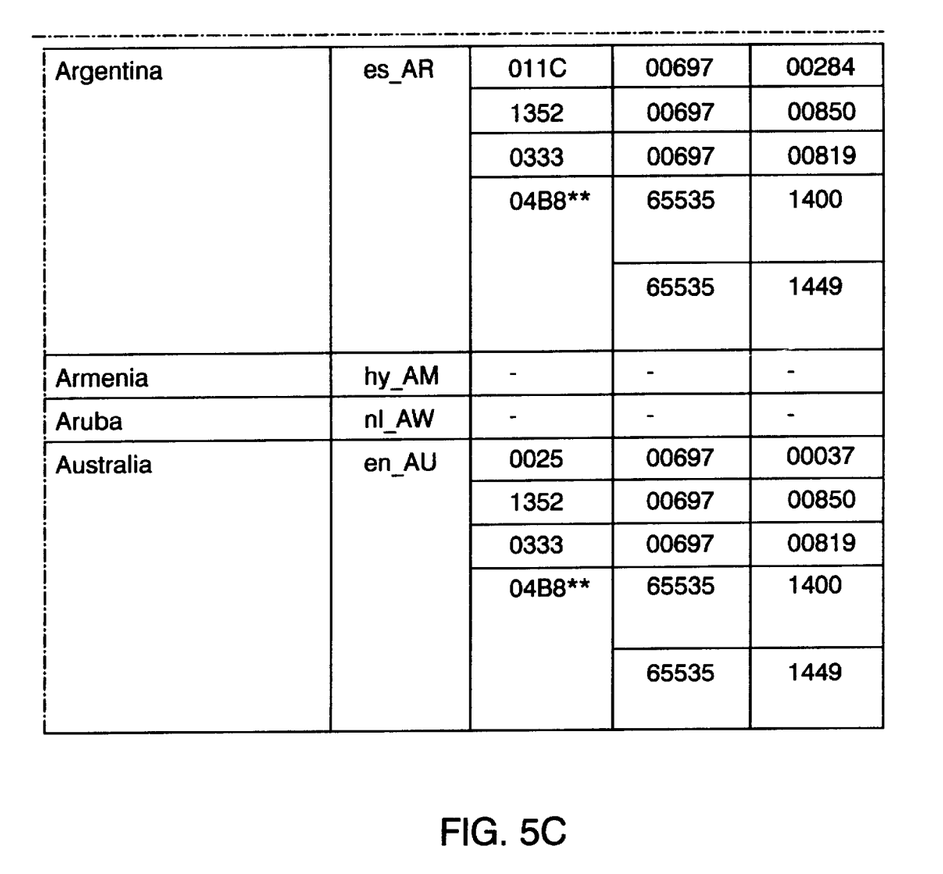
Figure 5D:
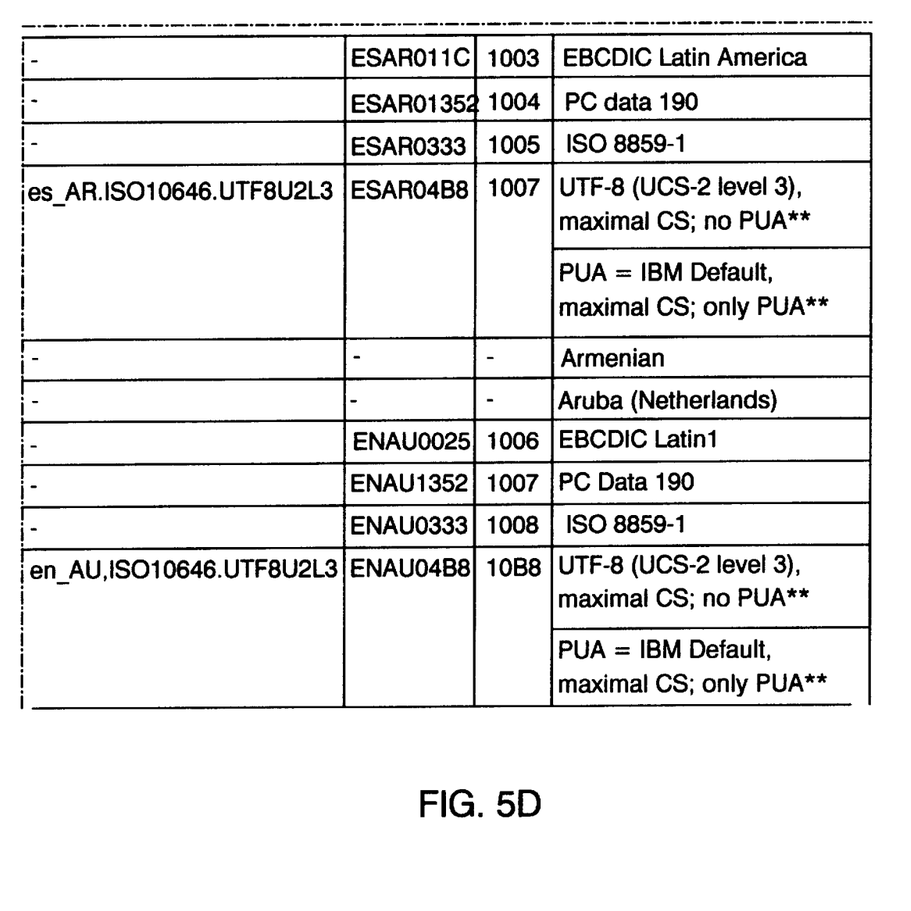

FIG. 5, including FIGS. 5A, 5B, 5C and 5D illustrates a portion of a lookup table according to a preferred embodiment of the invention, containing the country or territory name as implemented in ISO standards together with the language name as implemented in ISO standards, in the second column from the left, several representations of CCSID and code page indicators, and in the eighth column-from the left, the uniquely assigned locale token according to the invention.

An example of the use of the invention by two users on the same computer system is shown in FIG. 1. A first user at terminal 6 looks at a file on Direct Access Storage Device (DASD) 3; the file contains the locale token 2 in front of the body of the file to be viewed 1. The first user prefers to display documents as might be created in Albania, using the ISO language identifier "sq" and the territory identifier "AL". The first user also prefers the character set of CCSID 0366, thus defining all of the identifiers necessary for the display to that user. A second user at terminal 7 prefers to display files and documents as if they were created in Belgium in French, which uses the ISO language code "fr" and the territory code "BE". The appropriate CCSID for that user is 0333. In operation, the first user's files are prepared using interface adapter 9, which preselects a conversion table for "sq_AL" and CCSID 0366. The encoding conversion table is used to convert the file created by the first user. When it is moved to the second user's terminal, the initial locale code is replaced by the locale code for the second user's preference, the identifiers for the second user's language, territory and CCSID are substituted, and the file is displayed according to the second user's preferences in French, with Belgium as the territory and using the CCSID0333.

The locale token is logically associated with the file to be processed, and is preferably a part of the filename. In cases where the file is transmitted to another location it is preferred to have the token travel with the associated file. The association may be done by, for example, using extended file attributes.

Advantages of the invention include the ability to represent all of the known and proposed language, territory and character set identifiers in a space of four eight-bit bytes, thus enabling its representation in all of the existing file naming schemes including the most restrictive eight-byte scheme, DOS. The invention also makes it possible for applications to use different languages, territories and code sets on the same system as well as to be transmitted to remote systems.

While the invention has been described in its preferred embodiment, it will be apparent that changes can be made to the invention within the purview of the appended claims without departing from the scope and spirit of the invention in its broader aspects.

What is claimed is:

1. A computer-based method of encoding language, country and character set attributes of a file, said method comprising:
   (a) receiving a first code indicating required attributes of language;
   (b) receiving a second code indicating required attributes of country;
   (c) receiving a third code indicating a coded graphic character set identifier;
   (d) mapping said first, second and third codes into a unique two-byte hexadecimal code for use in association with said file;
   (e) outputting said unique two-byte hexadecimal code in association with said file; and
   (f) thereafter, in response to receipt of said unique two-byte hexadecimal code and said file, converting said file in accordance with said unique two-byte hexadecimal code such that at least one of said required attributes of languaqe, required attributes of country, and said graphic character set is altered.

2. The method as set forth in claim 1, wherein the first code defines at least one of: a font of accents made available for use with accented characters; sorting sequence instructions for accented characters, capitalized characters and connected characters; and a presence or an absence of hyphenation and the type of hyphenation.

3. The method as set forth in claim 1, wherein the first code is a two-character code.

4. The method as set forth in claim 1, wherein the second code is a two-character code.

5. The method as set forth in claim 1, wherein the third code is a four-character code.

6. The method as set forth in claim 3, wherein the second code is a two-character code and the third code is a four-character code.

7. The method as set forth in claim 1, wherein one of the codes represents a language identifier.

8. The method as set forth in claim 7, wherein the language identifier code is a standard ISO two-character code.

9. The method as set forth in claim 1, wherein one of the codes represents a territory identifier.

10. The method as set forth in claim 9, wherein the code representing a territory identifier is a two-character code.

11. The method as set forth in claim 1, wherein one of the codes represents a coded character set identifier.

12. The method as set forth in claim 11, wherein the code representing the coded character set identifier is a four-character code.

13. The method as set forth in claim 1, further including storing the unique two-byte hexadecimal code in the file name section of the file.

14. The method as set forth in claim 1, wherein the step of mapping is accomplished by the step of reading from a lookup table a locale code uniquely associated with a combination of codes for language, country and coded graphic character set identifier.

15. A computer system adapted to output a file having variable attributes of language, country and coded graphic character set identifiers, said file being displayable on a display, said computer system comprising:
   (a) storage means adapted to store said file in association with a two-byte hexadecimal code;
   (b) mapping means to map unique combinations of a code indicating required attributes of language, a code indicating required attributes of country, and a code indicating a coded graphic character set identifier into a two-byte hexadecimal code uniquely associated with a combination of codes for said language, country and coded graphic character set identifier; and
   (c) output means to output said file in association with said two-byte hexadecimal code.

16. The computer system as defined in claim 15, wherein said unique two-byte hexadecimal code is contained within a file name header used by an operating system for the computer system.

17. A computer system providing a computerized locale identifier for display of files containing values describing language, country and character encoding attributes, said computer system comprising:
   (a) storage means including a file containing a two-byte hexadecimal locale code mapped from unique combinations of individual codes including:
      (i) a language code;
      (ii) a country code; and
      (iii) a coded graphic character set identifier code; and
   (b) mapping means for converting combinations of said language code, country code and coded graphic character set identifier code into said unique two-byte hexadecimal locale code; and
   (c) output means for outputting said two-byte hexadecimal locale code from said computer in association with said file.

18. The computer system as defined in claim 17, wherein said mapping means is a lookup table.

19. The computer system as defined in claim 17, further comprising:
   (a) storage means for storing said language code, said country code, and said coded character set identifier code in association with said file; and
   (b) means for incorporating said unique two-byte hexadecimal locale code in association with said file for transmission from a first computer to a second computer.

20. An article of manufacture comprising a machine-readable medium, said medium having computer readable program code for handling language, country and coded graphic character set identifier requirements of a file by causing a computer to perform the steps of:

(a) receiving a language code, a country code, and a coded graphic character set identifier code associated with a file;

(b) mapping said language code, country code and coded graphic character set identifier code into a unique hexadecimal locale code two bytes in length; and (c) displaying said file in association with said locale code according to said language, country and coded graphic character set identifier codes.

21. The article of manufacture as defined in claim 20, wherein said mapping is performed by reading from a lookup table said locale code uniquely associated with a combination of language code, country code and coded graphic character set identifier code.

22. The article of manufacture as defined in claim 20, further including computer-readable program code for causing a computer to perform the steps of:

(a) receiving said file in a second computer;

(b) mapping said locale code into said language code, country code and coded graphic character set identifier code; and (c) displaying said file at said second computer according to said language code, country code and coded graphic character set identifier code.

* * * * *